US012510258B2

United States Patent
Yang et al.

(10) Patent No.: US 12,510,258 B2
(45) Date of Patent: Dec. 30, 2025

(54) RADIATION HEAT DISSIPATION AND RADIATION HEAT COLLECTION-BASED COLD AND HOT CENTRAL AIR CONDITIONING SYSTEM

(71) Applicant: Beijing Jingkelun Engineering Design and Research Institute Co., Ltd., Beijing (CN)

(72) Inventors: Jianguo Yang, Beijing (CN); Chengjun Zhou, Beijing (CN); Weibo Xie, Beijing (CN); Quanjiang Wang, Beijing (CN); Jianhui Kang, Beijing (CN); Jilong Zhang, Beijing (CN); Hui Zhao, Beijing (CN); Lixuan Hao, Beijing (CN); Tongqin Mao, Beijing (CN); Wenjie Cao, Beijing (CN); Haiying Chao, Beijing (CN); Xianting Zeng, Beijing (CN); Junzeng Li, Beijing (CN)

(73) Assignee: Beijing Jingkelun Engineering Design and Research Institute Co., Ltd., Beijing (CN)

( * ) Notice: Subject to any disclaimer, the term of this patent is extended or adjusted under 35 U.S.C. 154(b) by 376 days.

(21) Appl. No.: 18/247,972

(22) PCT Filed: Sep. 14, 2021

(86) PCT No.: PCT/CN2021/118124
§ 371 (c)(1),
(2) Date: Apr. 5, 2023

(87) PCT Pub. No.: WO2022/156237
PCT Pub. Date: Jul. 28, 2022

(65) Prior Publication Data
US 2023/0383964 A1    Nov. 30, 2023

(30) Foreign Application Priority Data

Jan. 21, 2021   (CN) .......................... 202110080757.6

(51) Int. Cl.
*F24F 5/00* (2006.01)
*F24F 1/14* (2011.01)

(52) U.S. Cl.
CPC .............. *F24F 5/0046* (2013.01); *F24F 1/14* (2013.01); *F24F 2005/0064* (2013.01)

(58) Field of Classification Search
CPC .... F24F 5/0046; F24F 1/14; F24F 2005/0064; Y02B 10/20; F25B 13/00; F25B 2313/02742
See application file for complete search history.

(56) References Cited

U.S. PATENT DOCUMENTS 3,039,453 A  *  6/1962   Andrassy .............. F24S 10/755
                                                        335/285
4,122,829 A  *  10/1978  Lowe ...................... F24S 80/40
                                                        126/704

(Continued)

FOREIGN PATENT DOCUMENTS

AU       2020101560 A4    9/2020
CN         201396961 Y    2/2010

(Continued)

OTHER PUBLICATIONS

Examination Report No. 1 for Standard Patent Application issued in AU Application No. 2021422201 dated Mar. 21, 2024; 3 pages.

(Continued)

*Primary Examiner* — Lionel Nouketcha
(74) *Attorney, Agent, or Firm* — Schwabe, Williamson & Wyatt, P.C.

(57) ABSTRACT

A radiation heat dissipation and radiation heat collection-based cold and hot central air conditioning system includes (Continued)

a compressor, a liquid storage device, an indoor unit and an outdoor unit connected in sequence, the outdoor unit includes a radiation heat collector; the radiation heat collector includes a protective plate, a heat absorption plate, and a plate core; the heat absorption plate is located between the plate core and the protective plate; the plate core comprises a heat exchange medium inlet end and a heat exchange medium outlet end; and the heat absorption plate is used for transferring absorbed heat to a heat exchange medium circulating in the plate core. The heat absorption plate collects heat, and then transfers the heat to the heat exchange medium flowing in the plate core; and the heat exchange medium carrying the heat is compressed by the compressor, and then enters the indoor unit for heat exchange.

9 Claims, 5 Drawing Sheets

(56) References Cited

U.S. PATENT DOCUMENTS

| | | | | | |
|---|---|---|---|---|---|
| 4,162,684 | A | * | 7/1979 | Loveless, Jr. | A01K 7/027 |
| | | | | | 126/635 |
| 4,252,103 | A | * | 2/1981 | Carter | F24S 80/453 |
| | | | | | 126/634 |
| 4,279,243 | A | * | 7/1981 | Deakin | F24S 10/503 |
| | | | | | 126/634 |
| 6,357,246 | B1 | * | 3/2002 | Jin | F25B 13/00 |
| | | | | | 62/235.1 |
| 6,837,236 | B1 | * | 1/2005 | Lichtenberger | F24D 17/0021 |
| | | | | | 126/634 |
| 2007/0235021 | A1 | * | 10/2007 | Reed | F24S 20/67 |
| | | | | | 126/621 |
| 2012/0199116 | A1 | * | 8/2012 | Sellier | F24S 80/70 |
| | | | | | 126/663 |
| 2018/0003414 | A1 | | 1/2018 | Huang et al. | |
| 2022/0252351 | A1 | | 8/2022 | Yang | |

FOREIGN PATENT DOCUMENTS

| | | | | |
|---|---|---|---|---|
| CN | 101806445 | A | | 8/2010 |
| CN | 101893347 | A | | 11/2010 |
| CN | 102840689 | A | | 12/2012 |
| CN | 202648015 | U | | 1/2013 |
| CN | 104633987 | A | * | 5/2015 ............. F24S 60/00 |
| CN | 106225311 | A | * | 12/2016 ............. F25B 41/20 |
| CN | 206399252 | U | | 8/2017 |
| CN | 107940647 | A | | 4/2018 |
| CN | 108709341 | A | | 10/2018 |
| CN | 110319716 | A | | 10/2019 |
| CN | 110595099 | A | | 12/2019 |
| CN | 210568953 | U | | 5/2020 |
| CN | 111503781 | A | | 8/2020 |
| CN | 111981709 | A | | 11/2020 |
| CN | 214469009 | U | | 10/2021 |
| EP | 2169331 | A2 | | 3/2010 |
| JP | H028658 | A | | 1/1990 |
| JP | H10274430 | A | | 10/1998 |
| JP | 2018179462 | A | | 11/2018 |
| JP | 2020051715 | A | | 4/2020 |
| WO | 2010037607 | A2 | | 4/2010 |
| WO | 2016086564 | A1 | | 6/2016 |

OTHER PUBLICATIONS

Notice of Reasons for Refusal issued in Japanese Application No. 2023-521573 dated Feb. 27, 2024; 13 pages including English translation.
Japan Patent Office, Second Notice of Reasons for Refusal in JP Application No. 2023-521573 with English translation, dated Aug. 27, 2024, 10 pages.
Saudi Arabian Patent Office, First Office Action in Saudi Arabian Counterpart Application with English translation, dated Sep. 28, 2024, 9 pages.
China National Intellectual Property Administration, First Office Action in CN Application No. 202110080757.6 with English translation, dated Oct. 31, 2024, 15 pages.
European Patent Office, Extended European Search Report in EP Application No. 21920615.8, dated Nov. 12, 2024, 9 pages.
International Search Report and Written Opinion for PCT/CN2021/118124, dated Dec. 14, 2021, 10 pages Including English translation.

* cited by examiner

RADIATION HEAT DISSIPATION AND RADIATION HEAT COLLECTION-BASED COLD AND HOT CENTRAL AIR CONDITIONING SYSTEM

CROSS-REFERENCE TO RELATED APPLICATION

The present application is a national phase entry under 35 U.S.C. § 371 of International Application No. PCT/CN2021/118124, filed Sep. 14, 2021 which designates the United States of America, which claims priority to Chinese Patent Application No. 202110080757.6, titled "RADIATION HEAT DISSIPATION AND RADIATION HEAT COLLECTION-BASED COLD AND HOT CENTRAL AIR CONDITIONING SYSTEM", filed with the China National Intellectual Property Administration on Jan. 21, 2021, the entire disclosures of each of these applications are hereby incorporated by reference in their entireties and for all purposes.

FIELD

The present application relates to the technical field of air conditioning, and in particular to a radiation heat dissipation and radiation heat collection-based cold and hot central air conditioning system.

BACKGROUND

Air conditioning energy consumption accounts for a large proportion of building energy consumption. Air conditioners are used frequently in winter and summer, and in the current situation of energy shortage, high energy consumption and outstanding environmental pollution, energy conservation and emission reduction are necessary for sustainable social development. Solar energy resources are very abundant in the nature where we live, and by making full use of these renewable energy sources to serve our daily life and production, the problems of energy shortage and high energy consumption can be alleviated to a great extent, which is very worthy of discussion and research.

In addition, in high-rise buildings, regardless of Freon or ammonia being used as refrigerant, due to the characteristics of high density, high viscosity and small pressure difference, the installation drop between indoor unit and outdoor unit is small, and the piping distance is short, which limits the use range of air conditioners; since the pressure generated by the existing cooling and heating air conditioning system itself cannot transfer the refrigerant to the rooms of high-rise buildings for direct cooling and heating, it is necessary to rely on the cheapest water medium to assist in energy transmission; that is, the water medium helps to transport the cooling capacity or heating capacity generated by the heating and cooling air conditioning system into the air-conditioned room in the high-rise building. Thus, it is necessary to set up a high-power water pump, which consumes a lot of electricity. Furthermore, the existing Freon air conditioners and ammonia air conditioners always have the defect of high energy consumption when used for heating.

SUMMARY

An object according to the present application is to overcome the shortcomings of the conventional technology, and provide a radiation heat dissipation and radiation heat collection-based cold and hot central air conditioning system, which can not only refrigerate but also heat, and has high efficiency and low energy consumption.

The technical solution of the radiation heat dissipation and radiation heat collection-based cold and hot central air conditioning system provided by the present application is as follows:

a radiation heat dissipation and radiation heat collection-based cold and hot central air conditioning system, including a compressor, a liquid accumulator, an indoor unit and an outdoor unit connected in sequence, the outdoor unit includes a radiation heat collector, the radiation heat collector includes a protection plate, a heat absorption plate and a plate core, the heat absorption plate is located between the plate core and the protection plate, the plate core includes a heat exchange medium inlet end and a heat exchange medium outlet end, the heat absorption plate is used to transfer the absorbed heat to the heat exchange medium circulating in the plate core.

Preferably, the plate core abuts against the heat absorption plate tightly on one side; glass wool is arranged on the other side of the plate core; the heat absorption plate is a solar heat collecting plate.

Preferably, the protection plate is made from tempered glass; the plate core is a serpentine coil; a heat collection module is formed by connecting multiple radiation heat collectors in series.

Preferably, the radiation heat collector further includes a heat exchanger composed of copper tubes and fins.

Preferably, the indoor unit includes a heat exchange medium circulating pipeline arranged in a high-rise building, and the high-rise building includes multiple indoor spaces, the multiple indoor space are provided with indoor heat exchangers, and a first throttle valve is provided at an inlet end and/or an outlet end of each indoor heat exchanger, a second throttle valve is arranged on the pipeline of each floor of the building.

Preferably, the outdoor unit includes a flash heat exchanger which is arranged in parallel with the radiation heat collector, a first electromagnetic valve is arranged on the pipeline of the radiation heat collector, a second electromagnetic valve is arranged on the pipeline of the flash heat exchanger.

Preferably, the flash heat exchanger includes a shell, a heat exchange unit, a water atomization device, a fan and a heat exchange medium flow pipe, the fan is arranged outside the shell and used for forming negative pressure in the shell; the heat exchange unit and the water atomization device are arranged in the shell, the coil in the heat exchange unit is connected with the heat exchange medium flow pipe.

Preferably, a controller for controlling the opening or closing of the water atomization device is arranged on the water atomization device, the controller is connected to the control center, the control center can randomly select the water atomization device to be opened or closed according to the set time, the set proportion of the water atomization devices opened, and the random function.

Preferably, the heat exchange unit further includes a heat exchange fin, and the coil is penetrated on the heat exchange fin;

the water atomization device includes an ultrasonic atomizer and a water tank, wherein the ultrasonic atomizer is arranged in the water tank;

multiple drawer-type heat exchange units are stacked to form a heat exchanger, and the shell is a closed shell;

the compressor and the liquid accumulator are arranged in a cabinet; the flash heat exchanger is also arranged in another cabinet.

Preferably, the central air conditioning system further includes a first four-way reversing valve and a second four-way reversing valve, four ports of the first four-way reversing valve are respectively connected with a compressor suction end, a compressor exhaust end, the outdoor unit and the indoor unit; four ports of the second four-way reversing valve are respectively connected with the outdoor unit, a liquid inlet of the liquid accumulator, a liquid outlet of the liquid accumulator and the indoor unit;

a one-way valve is arranged on the pipeline between the liquid accumulator and the second four-way reversing valve; a third throttle valve is arranged on the pipeline between the outdoor unit and the second four-way reversing valve;

the central air conditioning system is a single-stage carbon dioxide cycle system using carbon dioxide as a single cycle working medium.

The implementation of the present application includes the following technical effects.

In the radiation heat dissipation and radiation heat collection-based cold and hot central air conditioning system according to the present application, the heat absorption plate collects heat and transfers the heat to the heat exchange medium flowing in the plate core, the heat exchange medium carrying heat enters the indoor unit for heat exchange after being compressed by the compressor. Any object has the ability to continuously radiate, absorb and emit electromagnetic waves, as long as there is light with corresponding wavelength, the radiation heat collector can collect heat through optical radiation or temperature difference radiation. The central air conditioning system of the present application may also heat at ultra-low temperature.

REFERENCE NUMERALS IN THE DRAWINGS

1, indoor unit; 10, indoor heat exchanger; 11, first throttle valve; 12, second throttle valve; 2, outdoor unit; 20, radiation heat collector; 200, protection plate; 201, heat absorption plate; 202, plate core; 203, glass wool; 204, heat exchange medium inlet end; 205, heat exchange medium outlet end; 206, first electromagnetic valve; 21, flash heat exchanger; 210, shell; 211, heat exchange unit; 212, water atomization device; 213, fan; 214, heat exchange medium flow pipe; 217, second electromagnetic valve; 3, compressor; 4, liquid accumulator; 5, first four-way reversing valve; 6, second four-way reversing valve; 7, third throttle valve; 8, one-way valve.

DETAILED DESCRIPTION OF THE EMBODIMENTS

The present application is described in detail below with reference to the embodiments and the drawings. It should be noted that the described embodiments are only intended to facilitate the understanding of the present application and do not limit the present application.

Figure 1:
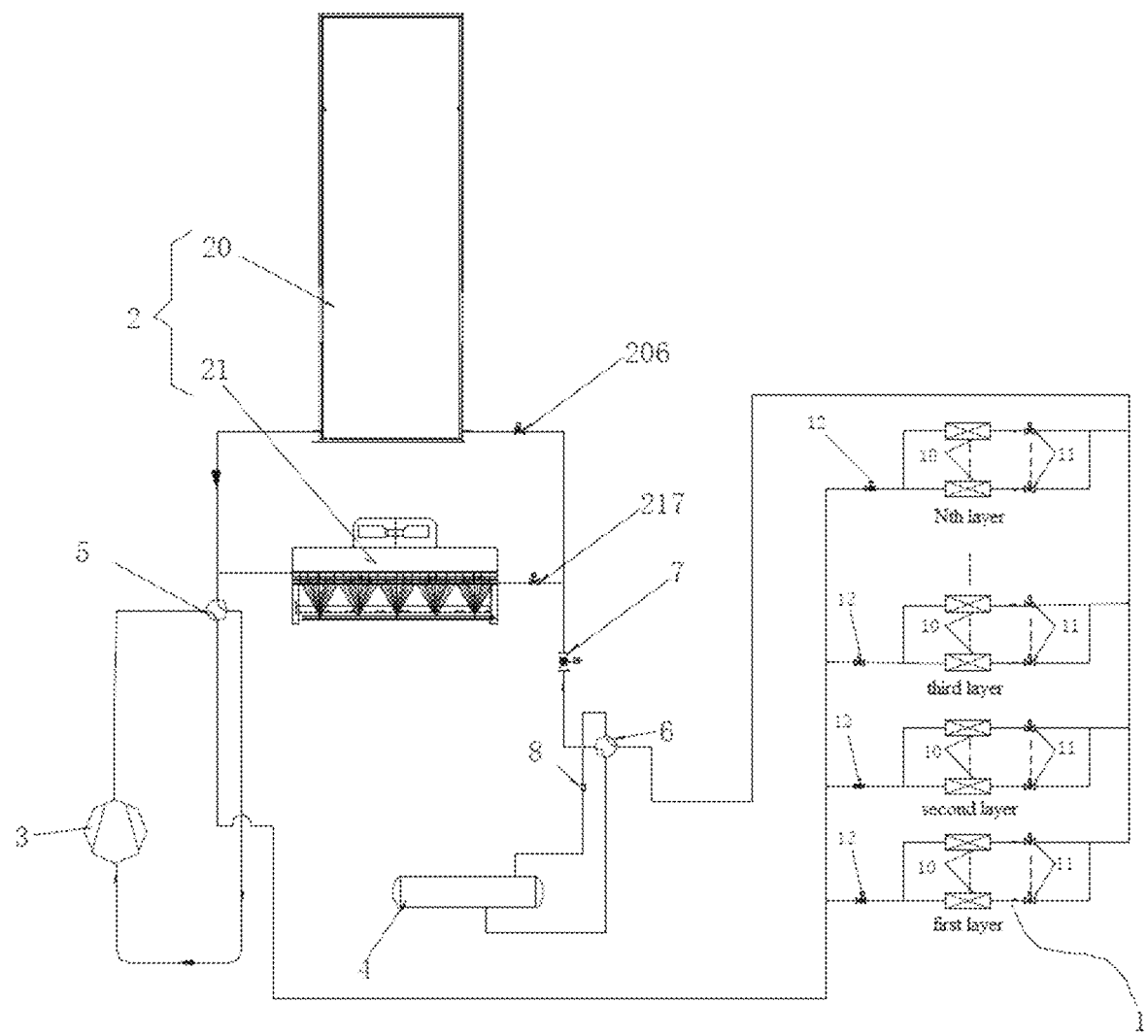
FIG. 1 is a schematic diagram of a radiation heat dissipation and radiation heat collection-based cold and hot central air conditioning system according to an embodiment of the present application.
Figure 2:
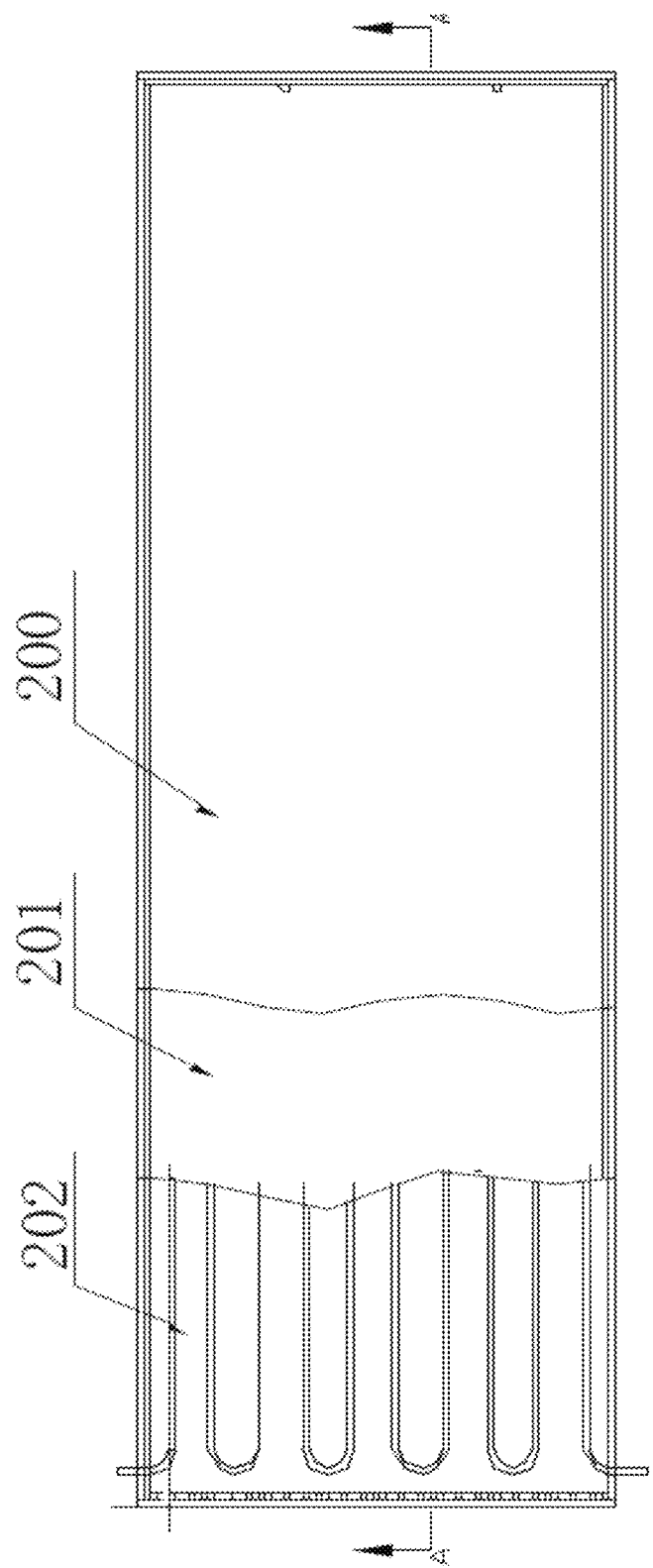
FIG. 2 is a schematic structural diagram of a radiation heat collector according to the embodiment of the present application.
Figure 3:
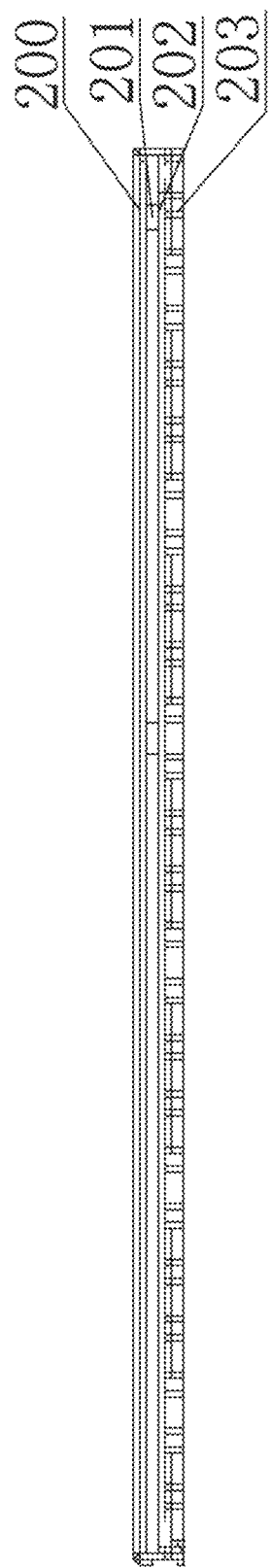
FIG. 3 is a schematic view of section A-A of FIG. 2.
Figure 4:
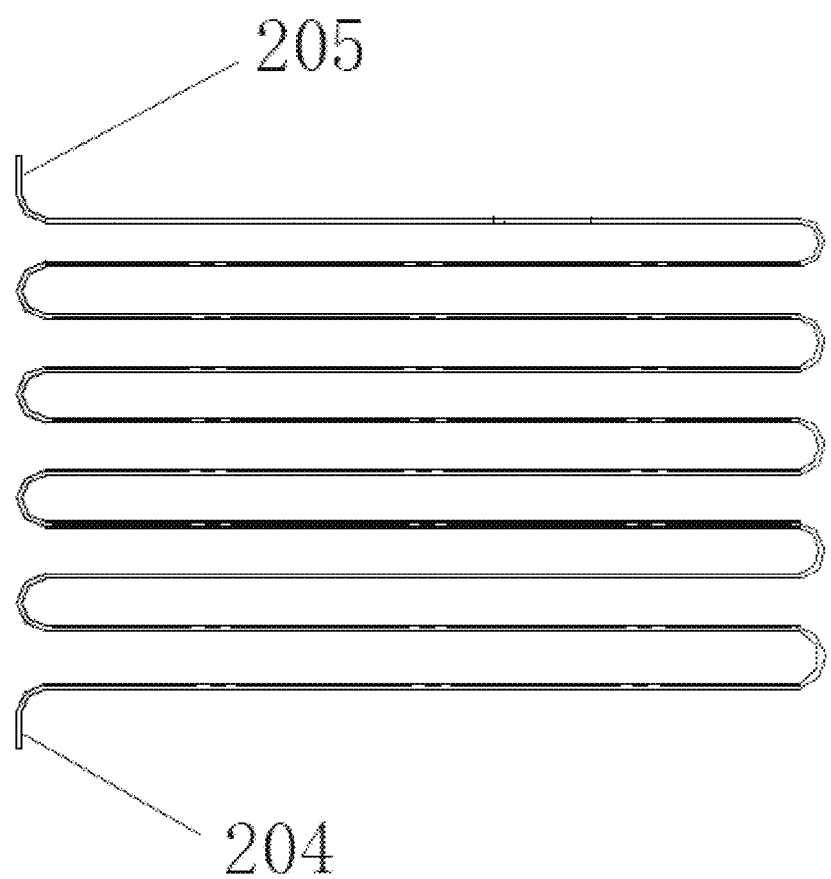
FIG. 4 is a schematic structural diagram of a plate core.

Referring to FIG. 1, the radiation heat dissipation and radiation heat collection-based cold and hot central air conditioning system provided by the embodiment includes a compressor 3, a liquid accumulator 4, an indoor unit 1 and an outdoor unit 2 connected in sequence, referring to FIG. 2 and FIG. 4, the outdoor unit 2 includes a radiation heat collector the radiation heat collector 20 includes a protection plate 200, a heat absorption plate 201 and a plate core 202, and, the heat absorption plate 201 is located between the plate core 202 and the protection plate 200, the plate core 202 includes a heat exchange medium inlet end 204 and a heat exchange medium outlet end 205, the heat absorption plate 201 transfers the collected heat to the heat exchange medium circulating in the plate core 202. The plate core 202 is arranged close to the heat absorption plate 201, and the protection plate 200 is used for protecting the heat absorption plate 201. The heat absorption plate 201 collects heat and transfers the heat directly to the heat exchange medium flowing in the plate core 202, the heat exchange medium carrying heat is compressed by the compressor 3 and then enters the indoor unit 1 for heat exchange, and the heat exchange medium of the central air conditioner directly exchanges heat with the heat absorption plate, which is one of the inventive points of this embodiment.

Specifically, the protection plate 200 is made from tempered glass, which has good light transmittance. The heat absorption plate 201 can be a solar heat collecting plate. Glass wool 203 is arranged on the other side of the plate core 202, and the glass wool 203 can play the role of heat preservation, reducing the heat exchange between the heat transfer medium carrying heat and the outside. Referring to FIG. 4, the plate core 202 is a serpentine coil, and the serpentine coil can increase the heat exchange area between the plate core 202 and the heat absorption plate 201. A heat collection module is formed by connecting multiple radiation heat collectors 20 in series. Any object has the ability to continuously radiate, absorb and emit electromagnetic waves, with the development of technology, the heat absorption plate is preferably a solar heat collecting plate. As long as there is light with the corresponding wavelength, the solar heat collecting plate can collect the heat radiated by light. The central air conditioning system of the embodiment may also heat at ultra-low temperature. In an embodiment, the radiation heat collector further includes a heat exchanger composed of copper tubes and fins, heat in the air is collected through fins; that is, when there is a temperature difference between the outside air and the heat exchange medium, heat in the air can be collected through the fins.

Referring to FIG. 1, the indoor unit 1 includes a heat exchange medium circulating pipeline arranged in a high-rise building, the high-rise building is a layered structure, and each floor includes multiple indoor spaces, the multiple indoor spaces are provided with indoor heat exchangers 10, and the indoor heat exchangers 10 are arranged in parallel or in series, an inlet end and/or an outlet end of each indoor heat exchanger 10 is provided with a first throttle valve 11, a second throttle valve 12 is arranged on the pipeline of each floor of the building; the first throttle valve 11 and the second throttle valve 12 are preferably electronic expansion valve groups, and the temperature of terminal refrigeration can be adjusted by adjusting the suction pressure of the compressor 3 and the opening of the electronic expansion valve, and the temperature adjustment range can reach −25° C. to 30° C.

Referring to FIG. 1, in order to realize the reversing of cooling and heating, the central air conditioning system further includes a first four-way reversing valve 5 and a second four-way reversing valve 6, four ports of the first four-way reversing valve 5 are respectively connected with a suction end of the compressor 3, an exhaust end of the compressor 3, the outdoor unit 2 and the indoor unit 1; four ports of the second four-way reversing valve 6 are respectively connected with the outdoor unit 2, a liquid inlet of the liquid accumulator 4, a liquid outlet of the liquid accumulator 4 and the indoor unit 1. FIG. 1 is a schematic connection diagram of an air conditioning system in a heating mode, in the heating mode, the first four-way reversing valve 5 connects the exhaust end of the compressor 3 with the indoor unit 1, and connects the outdoor unit 2 with the suction end of the compressor 3; the second four-way reversing valve 6 connects the outdoor unit 2 with the liquid accumulator 4, and connects the liquid accumulator 4 with the indoor unit 1; the heat exchange medium flows through the compressor 3, the first four-way reversing valve 5, the indoor unit 1, the liquid accumulator 4, the second four-way reversing valve 6, and the outdoor unit 2 in turn to complete the heating. In the cooling mode, the first four-way reversing valve 5 connects the exhaust end of the compressor 3 with the outlet end of the outdoor unit 2, and connects the outlet end of the indoor unit 1 with the suction end of the compressor 3; the second four-way reversing valve 6 connects the outlet end of the outdoor unit 2 with the inlet end of the liquid accumulator 4, and connects the outlet end of the liquid accumulator 4 with the inlet end of the indoor unit 1; the heat exchange medium flows through the compressor 3, the first four-way reversing valve 5, the outdoor heat exchanger, the second four-way reversing valve 6, the liquid accumulator 4 and the indoor heat exchanger 10 in turn to complete cooling. Specifically, a one-way valve 8 is arranged on the pipeline between the liquid accumulator 4 and the second four-way reversing valve 6. The one-way valve 8 can only circulate in one direction, and has the function of pressure adjustment, so that the pressure in the central air conditioner can always be kept within a suitable range to ensure the efficient operation of the system. The pipeline between the outdoor unit 2 and the second four-way reversing valve 6 is provided with a third throttle valve 7, preferably an electronic expansion valve, which has the function of throttling and reducing pressure.

The outdoor unit 2 further includes a flash heat exchanger 21, which is arranged in parallel with the radiation heat collector 20, a first electromagnetic valve 206 is arranged on the pipeline of the radiation heat collector 20, the first electromagnetic valve 206 is used to control whether the heat exchange medium flows through the radiation heat collector 20. A second electromagnetic valve 217 is arranged on the pipeline of the flash heat exchanger 21, the second electromagnetic valve 217 is used to control whether the heat exchange medium flows through the flash heat exchanger 21. In summer, when the central air conditioning system operates for cooling, the second electromagnetic valve 217 is opened, the first electromagnetic valve 206 is closed, and the flash heat exchanger 21 is used for heat removal; In winter, when the central air conditioning system operates for heating, the second electromagnetic valve 217 can be turned off, and the first electromagnetic valve 206 can be turned on, and the radiation heat collector 20 is used for heating.

The sun radiates and transmits energy in the form of electromagnetic waves, in the radiation heat dissipation and radiation heat collection-based cold and hot central air conditioning system of the embodiment, during heating, solar energy can be used for heating when the sunlight is sufficient, which is green and environmentally friendly. When the sunlight is insufficient, the radiation heat collector can also collect part of the heat by means of thermal radiation, and can also use the air energy collector to collect the heat, alternatively, the flash heat exchanger 21 can be started to take heat, which ensures the heating demand. The radiation heat collector or the flash heat exchanger is used as a tool, the heating efficiency of central air conditioning is greatly improved by adopting the methods of radiation heat collection by light energy, radiation heat collection by temperature difference and radiation heat collection by droplets in flash heat exchanger. During cooling, the flash heat exchanger is used to take away the indoor heat by radiation between the heat exchange medium and the droplets.

The heat exchange medium can be Freon, ammonia, carbon dioxide and other media, in this embodiment, carbon dioxide medium is preferably used as the cooling and heating medium of the central air conditioner, as a circulating working medium, carbon dioxide has the advantages of large pressure difference, good fluidity, low density and transcritical phase change, and can be used in high-rise buildings. The indoor heat exchange medium circulating pipeline is connected to a single-stage carbon dioxide circulation system using carbon dioxide as a single circulation working medium, the meaning of single stage is different from cascade system, which only uses carbon dioxide medium for circulation, and cascade is not required. The multi-split central air conditioning system in this embodiment uses carbon dioxide as the working medium and can provide cooling or heating for higher floors at vertical height, the central air conditioning system can travel a longer distance in the plane floors and can drive more indoor units to work. The evaporation temperature can be controlled by controlling the suction pressure of the compressor 3, for example, the evaporation temperature can be controlled between 6-10 degrees Celsius, and the somatosensory effect is better. Compared with the traditional air conditioner, the central air conditioning system of this embodiment is more efficient and energy-saving. Specifically, the efficiency can be improved by more than 2 times and the energy can be saved by more than 50%.

Figure 5:
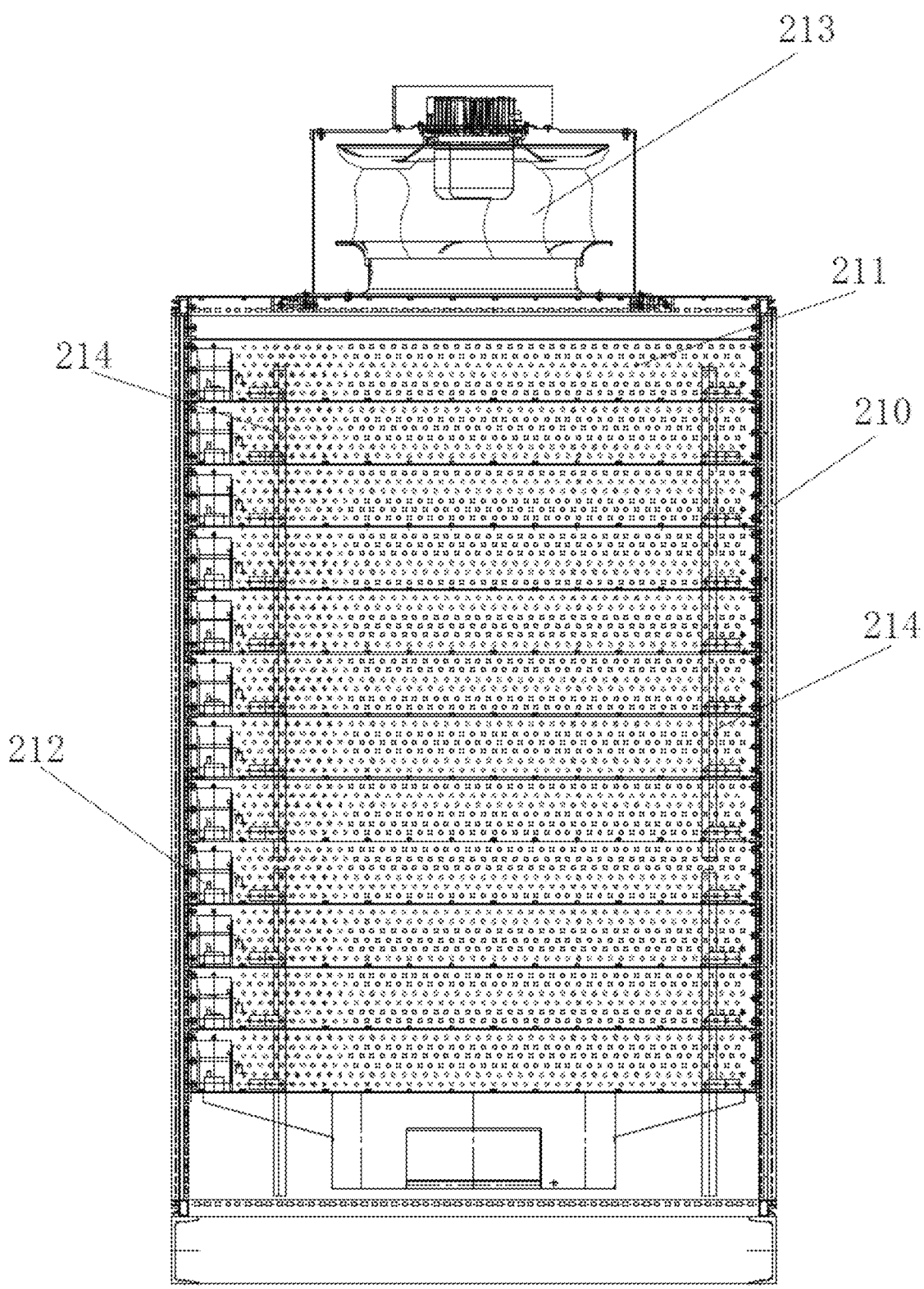
FIG. 5 is a schematic structural diagram of a flash heat exchanger.

Specifically, as shown in FIG. 5, the flash heat exchanger 21 includes a shell 210, a heat exchange unit 211, a water atomization device 212, a fan 213 and a heat exchange medium flow pipe 214, the fan 213 is arranged outside the shell 210 and used for forming negative pressure in the shell 210; the heat exchange unit 211 and multiple independent water atomization devices 212 are arranged in the shell 210; specifically, the coil in the heat exchange unit 211 is connected with the heat exchange medium flow pipe 214. The heat exchange unit 211 may further include a heat exchange fin, and the coil penetrates the heat exchange fin. A controller for controlling the opening or closing of the water atomization device 212 is arranged on the water atomization device 212, the controller is connected to the control center. The control center can randomly select the water atomization device 212 to be opened or closed according to the set time (for example, 1 second to 200 seconds), the set proportion of the water atomization devices 212 opened (for example, perforated 10%-90% water atomization device 212), and the random function, the opening or closing of each water atomization device 212 is random to achieve the effect of uniform atomization liquid in the shell 210. In the actual operation process, when the heating requirement can be met only by turning on 50% of the spray heads, the existing practice is to turn off all the water atomization devices 212. If this operation is carried out, the atomized liquid in the shell 210 may be unevenly distributed, affecting the heat transfer effect; if part of the water atomization device 212 is closed manually, the operation is not convenient. In this embodiment, a part of the water atomization device 212 can be randomly turned off at a certain interval (for example, 30 seconds) in the control center (the existing random controller can be selected), which makes each water atomization device 212 have the same probability of being turned on or off at random, and the atomized liquid in the shell 210 may always be in a uniform state.

The water atomization device 212 is used to atomize the liquid, and the atomized liquid diffuses around the heat exchange unit 211. Under the action of negative pressure, the liquid micelles and the heat exchange medium in the heat exchange unit 211 complete radiation heat exchange and are drawn out of the shell 210 by the fan 213. The water atomization device 212 is preferably an ultrasonic atomizer, which is arranged in the water tank.

Multiple drawer-type heat exchange units 211 are stacked to form a heat exchanger, which is convenient for installation and maintenance. When a certain heat exchange unit 211 is broken, the broken heat exchange unit 211 can be removed for maintenance or replacement. Preferably, the shell 210 is a closed shell, and the fan 213 can form a set negative pressure value in the closed shell 210 to realize more efficient heat exchange. The exhaust amount of the fan 213 is larger than the evaporation amount of the atomized liquid in the shell 210; on one hand, the vapor in the shell 210 can be fully discharged, so as to improve the evaporation efficiency of the atomized liquid, and on the other hand, the negative-pressure environment in the shell 210 can be maintained. It should be noted that, different from the existing air-cooled heat exchanger and evaporative cooling heat exchanger, the flash heat exchanger in this example has no external gas entering under negative pressure, except for the external gas entering the pressure regulating device, the high temperature and high humidity conditions do not affect the heat transfer, and the flash heat exchanger can be used normally under different climatic conditions.

Preferably, the compressor 3, the control valve and the liquid accumulator 4 are arranged in a cabinet; the flash heat exchanger is modularized, and the flash heat exchanger 21 is also arranged in another cabinet.

With the flash heat exchanger of this embodiment, the requirement of air conditioning refrigeration can be achieved by using carbon dioxide single-stage circulation, the carbon dioxide medium can be circulated in high-rise buildings over 100 meters; the cooling efficiency of the central air conditioning is more than 4.5. Carbon dioxide has a GWP of 1 and an ODP of 0, which is an environment-friendly refrigerant, has good safety, good chemical stability, excellent flow and heat transfer characteristics, which is non-toxic, non-flammable, and suitable for all kinds of lubricating oil, moreover, carbon dioxide has good thermal properties, the cooling capacity per unit volume is large and the kinematic viscosity is low. However, because the critical temperature of carbon dioxide is low (31.1° C.), it is easier to stay in a gaseous state at ambient temperature in summer, and the critical pressure is high (7.38 MPa), due to the high pressure of carbon dioxide in gaseous state, the operating pressure of the system is high and the throttling loss is large. Based on the characteristics of carbon dioxide, by using the technical scheme of this embodiment, the pressure in the central air conditioner can be kept in an appropriate range, and the carbon dioxide can be ensured to be in a liquid state at the outlet of the outdoor unit 2. Therefore, the heat exchange effect in the terminal heat exchanger is better, and one main engine can tow more terminal heat exchangers (more than 100) and ensure the safe and normal operation of the system.

Finally, it should be noted that, the above embodiments are only used for illustration of the technical solutions of the present application rather than limitation to the protection scope of the present application. Although the present application has been illustrated in detail with reference to the preferred embodiments, it should be understood by those skilled in the art that, modifications or equivalent replacements may be made to the technical solutions of the present application without departing from the essence and scope of the present application.

The invention claimed is:

1. A radiation heat dissipation and radiation heat collection-based cold and hot central air conditioning system, comprising:
    a compressor,
    a liquid accumulator,
    an indoor unit, and
    an outdoor unit,
    wherein the compressor, the liquid accumulator, the indoor unit, and the outdoor unit are connected in sequence,
    wherein the outdoor unit comprises:
        a radiation heat collector, and
        a flash heat exchanger,
        wherein the radiation heat collector comprises a protection plate, a heat absorption plate and a plate core, the heat absorption plate is located between the plate core and the protection plate, the plate core comprises a heat exchange medium inlet end and a heat exchange medium outlet end, and the heat absorption plate is used to transfer heat, which is absorbed, to the heat exchange medium circulating in the plate core,
        wherein the flash heat exchanger is arranged in parallel with the radiation heat collector, a first electromagnetic valve is arranged on a pipeline of the radiation heat collector, and a second electromagnetic valve is arranged on a pipeline of the flash heat exchanger.

2. The radiation heat dissipation and radiation heat collection-based cold and hot central air conditioning system according to claim 1, wherein the plate core abuts against the heat absorption plate tightly on one side; glass wool is arranged on the other side of the plate core; the heat absorption plate is a solar heat collecting plate.

3. The radiation heat dissipation and radiation heat collection-based cold and hot central air conditioning system according to claim 1, wherein the protection plate is made from tempered glass.

4. The radiation heat dissipation and radiation heat collection-based cold and hot central air conditioning system according to claim 1, wherein the radiation heat collector further comprises a heat exchanger composed of copper tubes and fins.

5. The radiation heat dissipation and radiation heat collection-based cold and hot central air conditioning system according to claim 1, wherein the indoor unit comprises a heat exchange medium circulating pipeline arranged in a high-rise building, and the high-rise building comprises a plurality of indoor spaces, the plurality of indoor space is provided with a plurality of indoor heat exchangers, and a first throttle valve is provided at an inlet end and/or an outlet end of each indoor heat exchanger, a second throttle valve is arranged on a pipeline of each floor of the building.

6. The radiation heat dissipation and radiation heat collection-based cold and hot central air conditioning system according to claim 1, wherein the flash heat exchanger comprises:
   a shell,
   a heat exchange unit,
   a water atomization device,
   a fan, and
   a heat exchange medium flow pipe,
   wherein the fan is arranged outside the shell and used for forming negative pressure in the shell; the heat exchange unit and the water atomization device are arranged in the shell, the coil in the heat exchange unit is connected with the heat exchange medium flow pipe.

7. The radiation heat dissipation and radiation heat collection-based cold and hot central air conditioning system according to claim 6, wherein a controller for controlling the opening or closing of the water atomization device is arranged on the water atomization device, the controller is connected to the control center, the control center is configured to randomly select the water atomization device to be opened or closed according to a set time, a set proportion of the water atomization devices opened, and a random function.

8. The radiation heat dissipation and radiation heat collection-based cold and hot central air conditioning system according to claim 6, wherein the water atomization device comprises:
   an ultrasonic atomizer, and
   a water tank,
   wherein the ultrasonic atomizer is arranged in the water tank; a plurality of drawer-type heat exchange units are stacked to form a heat exchanger, and the shell is a closed shell; the compressor and the liquid accumulator are arranged in a cabinet; the flash heat exchanger is also arranged in another cabinet.

9. The radiation heat dissipation and radiation heat collection-based cold and hot central air conditioning system according to claim 1, wherein the central air conditioning system further comprises:
   a first four-way reversing valve, and
   a second four-way reversing valve,
   wherein four ports of the first four-way reversing valve are respectively connected with a compressor suction end, a compressor exhaust end, the outdoor unit and the indoor unit; four ports of the second four-way reversing valve are respectively connected with the outdoor unit, a liquid inlet of the liquid accumulator, a liquid outlet of the liquid accumulator and the indoor unit; a one-way valve is arranged on a pipeline between the liquid accumulator and the second four-way reversing valve; a third throttle valve is arranged on a pipeline between the outdoor unit and the second four-way reversing valve; the central air conditioning system is a single-stage carbon dioxide cycle system using carbon dioxide as a single cycle working medium.

* * * * *